J. MARQUIS.
Steam Plow and Cultivator.

No. 82,538. Patented Sept. 29, 1868.

Witnesses:

Inventor:

UNITED STATES PATENT OFFICE.

JOHN MARQUIS, OF SAN FRANCISCO, CALIFORNIA, ASSIGNOR TO HIMSELF AND OLE BERGERSON, OF SAME PLACE.

IMPROVEMENT IN STEAM-PROPELLER PLOW AND CULTIVATOR.

Specification forming part of Letters Patent No. 82,538, dated September 29, 1868; antedated September 16, 1868.

*To all whom it may concern:*

Be it known that I, JOHN MARQUIS, of the city and county of San Francisco, State of California, have invented an Improved Steam-Propeller Plow and Cultivator; and I do hereby declare the following description and accompanying drawings are sufficient to enable any person skilled in the art or science to which it most nearly appertains to make and use my said invention or improvements without further invention or experiment.

The object of my invention is to provide an improved plow and cultivator to be propelled by steam or other motive power, and so arranged as to produce an auxiliary or traction forward by the peculiar shape of the cutters as the machine is operated.

The series of plows or cutters is attached to horizontal shafts placed transversely across a frame, on a line with the draft, and are actuated by spur-gears, the center shaft being longer than the others, and is geared by a bevel-gearing to a pulley upon an axle which revolves. The cutters are in form similar to that of a screw used in propelling vessels through the water, having four blades with curved bits at their ends, and are placed in a diagonal line along the rear part of the frame, so that they will overtop each other, and operate the one back of the other, cutting at right angles to the line of the draft.

The driving-shaft turns in the bearings or hubs of the traction-wheels and independent of them, and the motive power is attached directly to the frame, by placing a steam-engine upon it with the necessary appliances and connections for propelling, steering, raising, and lowering the cutters.

To more fully illustrate and explain my invention, reference is had to the accompanying drawings and letters marked thereon, forming a part of this specification, of which—

Figure 1:
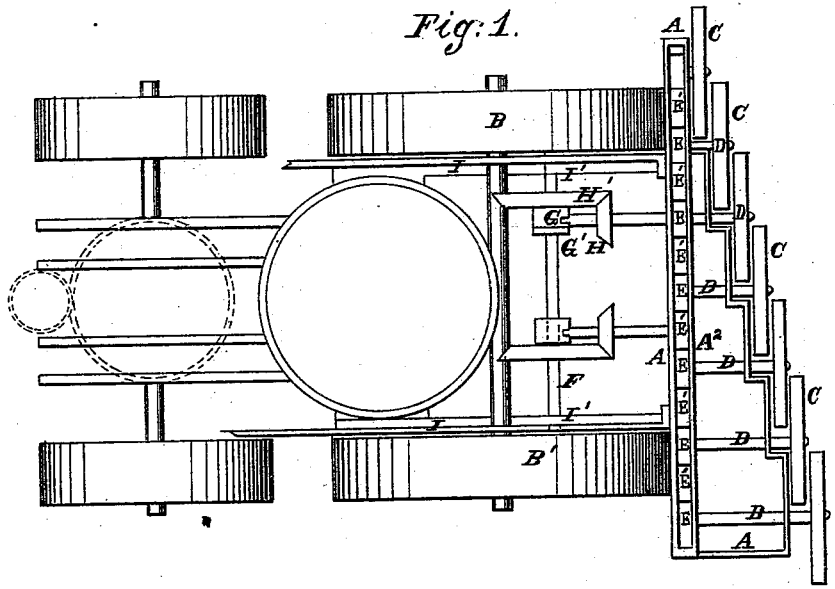
Figure 4:
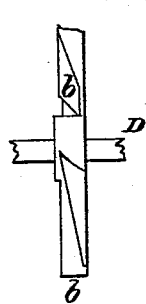
Figure 2:
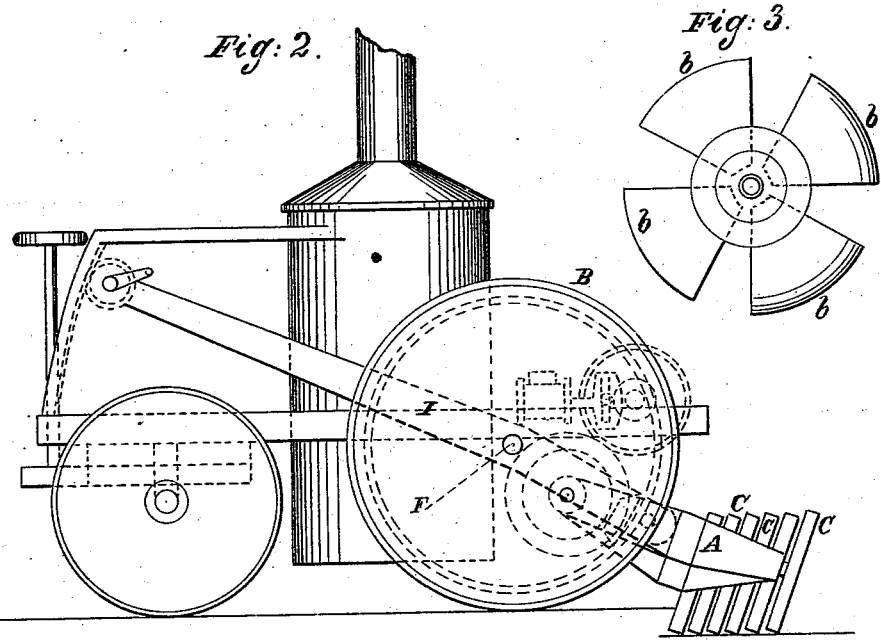
Figure 3:
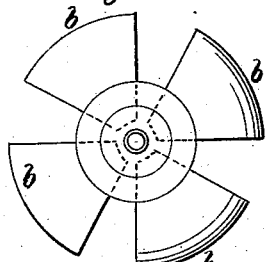

Figure 1 is a plan. Fig. 2 is a side elevation, showing the extended frame, device for steering, raising, and lowering the engine attachments. Fig. 3 is a plan of the cutters. Fig. 4 is an edge view of the cutters.

A A is a strong frame, of wood or iron, and of suitable shape, which supports the machinery, and is mounted upon two broad wheels, B and B′.

The cutters C C C are constructed with four curved blades, having bits $b\ b\ b$ at their ends turned from the direction of the draft, so that as they enter the soil, in rotating, it will be turned over from the bottom of the furrow. The hub and arms of the cutters may be made of cast-iron and the bits of steel. They are attached to the ends of the spindles D D D D′ by set-screws or keys, and are placed in a diagonal line across the rear portion of the frame in graduated steps, the one operating back of the other and overlapping each other to near the axis of revolution, and arranged so as to overcome all lateral or side pressure from the draft, and have a progressive tendency in their rotations, and cut the entire space over which they are caused to travel.

Near the opposite ends of the cutter-shafts are attached pinions E E E, with alternating pinions or spurs E′ E′ E′ between. These pinions move in the opening of the two portions of the frame $A^1$ and $A^2$, through which they have their bearings. The cutter-shafts have their bearings in this part of the frame also, as well as in that of the graduated step in the rear.

The spindle or shaft D′ is made longer than those shown at D D, and extends to the driving shaft or axle F, having its step in a collar, G, which admits of the shaft revolving in it. This collar is placed against a fixed collar, G′, which turns with the axle. On this spindle D′ a small bevel-gear, H, is formed to operate in a larger one, H′, at the side of a pulley upon the driving-shaft.

The horizontal bars I I are attached to the front side of the frame and extend beyond the driving-wheels, the axle F passing through them, and operating loosely in collars I′ I′. By this means the cutters and frame are raised and lowered, and if the driving-wheels are keyed to the axle it will make no difference, as the axle only acts as a fulcrum for this purpose.

If the machine is to be propelled by animal-power, the driving-wheels must be keyed to the axle F.

If operated by steam-power, the frame may be extended and the engine mounted upon it, with a steering-wheel in front, with bars at each side attached to the frame and extending forward, to which is attached a rack and pinion for raising and lowering the cutters. (Partially shown in Fig. 2.) In this case the motive power would be derived from the engine by a belt-connection or other device to the pulley which actuates the bevel-gear, communicating motion to the shaft or spindle D and the spur-wheels between that portion of the frame represented at $A^1$ and $A^2$, thereby causing the cutters to rotate in the same direction as rapidly as desired.

The cutters will cut in the same proportion as the blades progress on the ground—as, for instance, if the blades of the screw have a pitch or reach of, say, three inches, and there are four blades to each screw, the reach or progress will be twelve inches at each revolution, in which case it will be necessary to gear the driving-wheels to move one foot forward, so that, in case of employing animal-power instead of steam, the motion of the wheels forward will communicate motion to the cutters.

Having thus described my invention, what I claim, and desire to secure by Letters Patent, is—

1. The construction and application of the cutters C C C, in form similar to that of a screw, and having bits $b\ b\ b$ at the ends of the blades, substantially as described, for the purpose set forth.

2. The attachment of the said cutters or screws in a diagonal manner to the rear portion of the frame at such an angle as to overcome the side draft and impart to the said cutters in their rotation a progressive tendency, substantially as described.

3. The bars or levers I I, for raising and lowering the frame and cutters, and employing the axle as a fulcrum for that purpose, substantially as descriped.

In witness whereof I have hereunto set my hand and seal.

JOHN MARQUIS. [L. S.]

Witnesses:
C. W. M. SMITH,
GEO. H. STRONG.